May 5, 1970    H. L. JONES    3,509,780
DOUBLE-ACTION ROTARY SOLENOID DRIVE MECHANISM
Filed May 24, 1968    3 Sheets-Sheet 1

INVENTOR.
HUGH L. JONES
BY B. A. Chisma
   Norman E. Schlender
   ATTORNEYS

May 5, 1970     H. L. JONES     3,509,780
DOUBLE-ACTION ROTARY SOLENOID DRIVE MECHANISM
Filed May 24, 1968     3 Sheets-Sheet 2

INVENTOR.
HUGH L. JONES
BY
ATTORNEYS

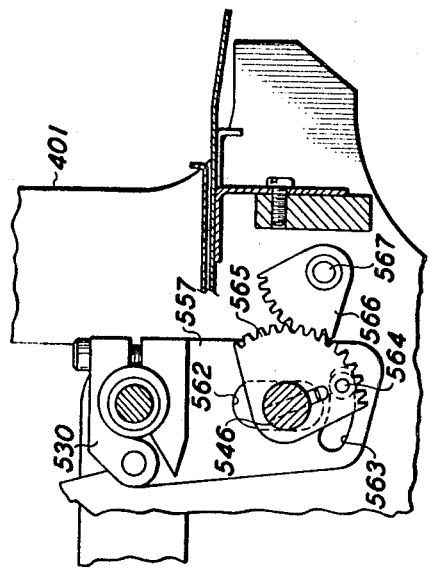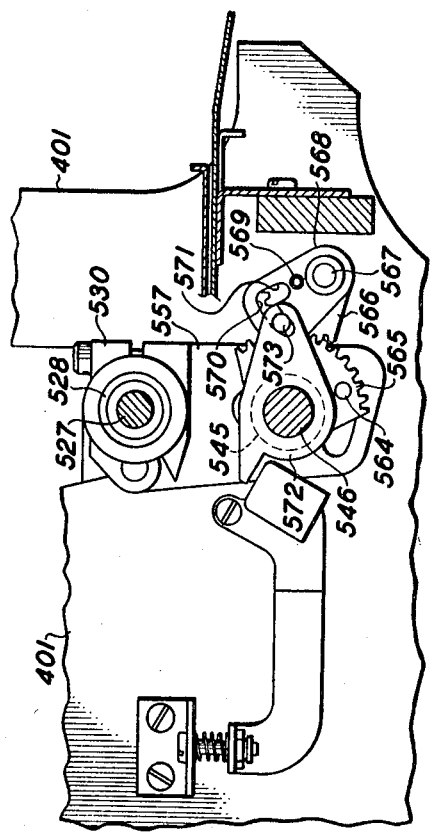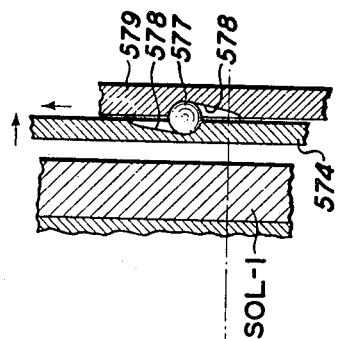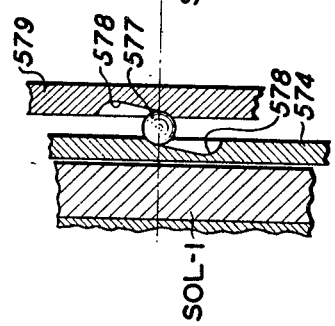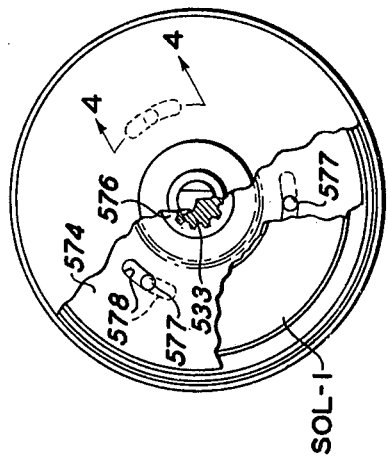
INVENTOR.
HUGH L. JONES
ATTORNEYS

United States Patent Office 3,509,780
Patented May 5, 1970

3,509,780
DOUBLE-ACTION ROTARY SOLENOID DRIVE MECHANISM
Hugh L. Jones, Rochester, N.Y., assignor to Xerox Corporation, Rochester, N.Y., a corporation of New York
Filed May 24, 1968, Ser. No. 731,995
Int. Cl. F16h 21/44; H02k 7/10; H03j 1/00
U.S. Cl. 74—107
4 Claims

ABSTRACT OF THE DISCLOSURE

A drive mechanism for imparting limited rotation of a shaft in either direction without axial movement of the shaft using two flat solenoid assemblys, each to impart the rotation in one direction upon energization thereof. Axial movement of the shaft is prevented by a sliding connection between each of the armatures for the solenoids and the shaft.

---

This invention relates to drive mechanisms, and particularly to improvements in signal triggered devices to impart double rotative motion to a drive shaft that is particularly adapted for use with sheet registration devices in automatic copiers/reproducers of the high speed type.

As is well known in recent years, the steadily increasing size of various industries has required an enormous increase in the amount of paper work that must be accomplished, maintained, and made available for wide interplant circulation. In the present day commercial automatic copiers/reproduction machines, which are adapted to produce copies of between 5 and 60 8 x 11" sheets of copy per minute, the sheet registration devices associated with the paper handling component of the machine utilize cumbersome, and complicated control devices for controlling sheet alignment just prior to the image transfer function.

As a solution for overcoming some disadvantages for high speed copying, the latest machine concept for copiers utilizes flash exposure of a document and the arrangement of a moving photoconductor material in the form of an endless belt. However, there has been no effective way in which to insure the continuous high speed feed of sheet material to the belt that is trouble free and consistent sheet-image alignment for the transfer step of the reproduction process.

It is therefore the principal object of this invention to improve drive mechanisms that will assure complete control in the rotation of a drive shaft in either direction by utilizing individual actuable motion-imparting devices.

Another object of this invention is to incorporate two solenoids with a drive shaft for rotating the same in either direction without moving the shaft axially.

These and other objects of this invention are obtained by means of a first flat or pancake solenoid having its disc-like armature encircling a drive shaft and a second pancake solenoid arranged in the same way relative to the shaft. A set of ball-inclined plane drive systems are associated with each of the armatures for causing rotation thereof upon energization of the respective solenoid coil. Each of the armatures is adapted to rotate the shaft in one direction and slide relative thereto.

For a better understanding of the invention as well as other objects and further features thereof, reference is had to the following detailed description of the invention to be read in conjunction with the accompanying drawings, wherein:

FIG. 3 is an end view of the double rotary solenoid utilized to effect sheet registration and feed out;

FIG. 4 is a fragmentary enlarged view of a rotary drive device taken along the line 4—4 in FIG. 3;

FIG. 5 illustrates another position of operation of the rotary device of FIG. 4;

FIG. 6 is a sectional view of a detail used with the registration rollers taken along line 6—6 in FIG. 2;

FIG. 7 is a sectional view of another detail taken along line 7—7 in FIG. 2;

Figure 1:
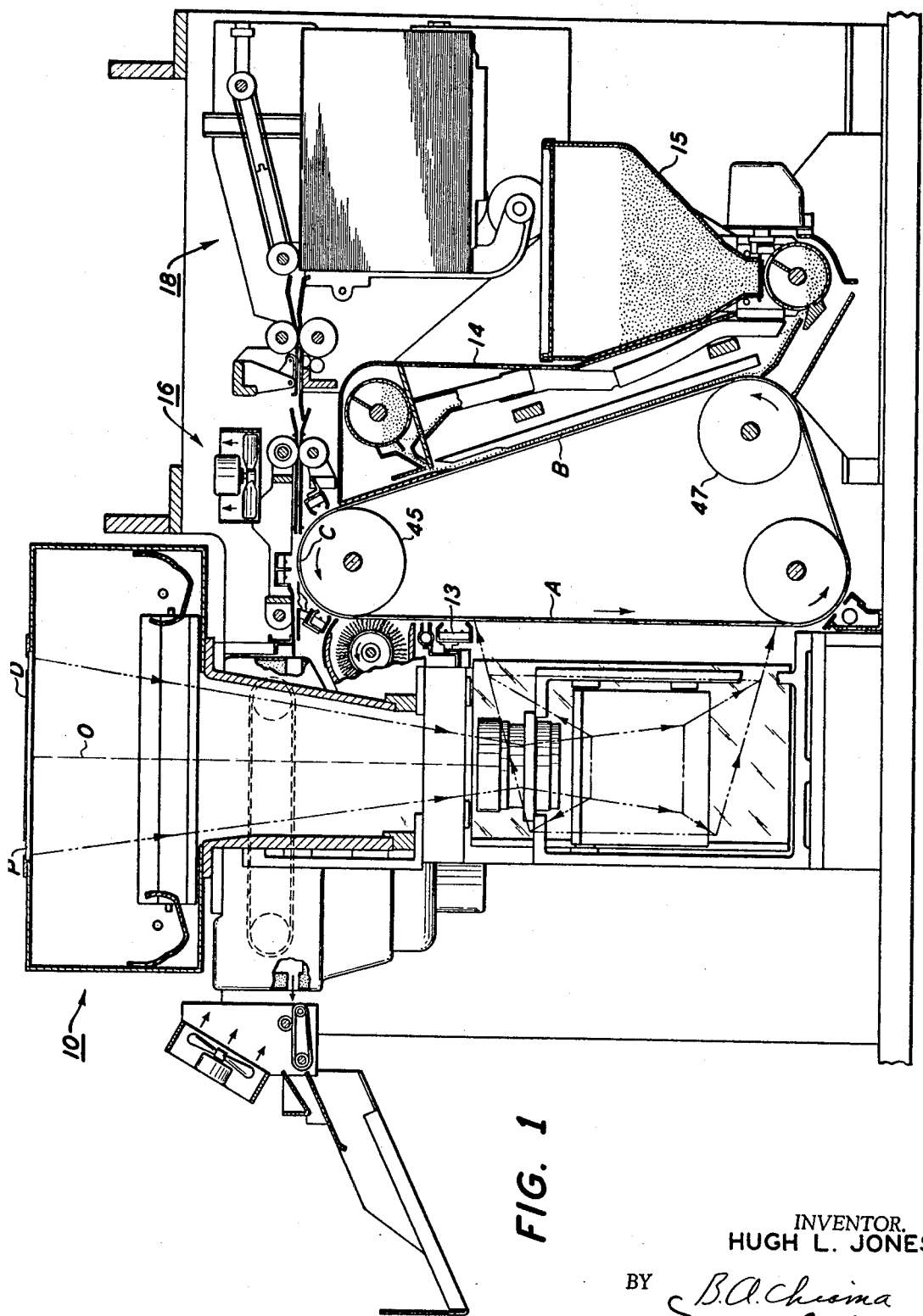
FIG. 1 is a schematic sectional view of a reproduction machine incorporating the present invention therein with the processing components in section to better illustrate the environment for the present invention.

For a general understanding of the illustrated copier/reproduction machine, in which the invention may be incorporated, reference is had to FIG. 1 in which the various system components for the machine are schematically illustrated. As in all electrostatic systems such as a xerographic machine of the type illustrated, a light image of a document to be reproduced is projected onto the sensitized surface of a xerographic plate to form an electrostatic latent image thereon. Thereafter, the latent image is developed with an oppositely charged developing material to form a xerographic powder image, corresponding to the latent image on the plate surface. The powder image is then electrostatically transferred to a support surface to which it may be fused by a fusing device whereby the powder image is caused permanently to adhere to the support surface.

In the illustrated machine, an original to be copied is placed upon a transparent support platen P fixedly arranged in an illumination assembly generally indicated by the reference numeral 10, arranged at the left end of the machine. While upon the platen, an illumination system flashes light rays upon the original thereby producing image rays corresponding to the informational areas on the original. The image rays are projected by means of an optical system for exposing the photosensitive surface of a xerographic plate in the form of a flexible photoconductive belt 12 arranged on a belt assembly slidably mounted upon a support bracket secured to the frame of the machine and is adapted to drive the selenium belt 12 in the direction of the arrow at a constant rate. During this movement of the belt, the reflected light image of an original on the platen is flashed upon the xerographic surface of the belt. The belt surface that intercepts the light rays comprises a layer of photoconductive material such as selenium on a conductive backing that is sensitized prior to exposure by means of a charging corona generator device indicated at 13.

The flash exposure of the belt surface to the light image discharges the photoconductive layer in the areas struck by light, whereby there remains on the belt a latent electrostatic image in image configuration corresponding to the light image projected from the original on the supporting platen. As the belt surface continues its movement, the electrostatic image passes through a developing station B in which there is positioned a developer assembly generally indicated by the reference numeral 14 and where the belt is maintained in a flat condition. The developer assembly 14 comprises horizontally and vertically conveying mechanisms which carry developing material to the upper part of the belt assembly whereat the material is dispensed and directed to cascade down over the upwardly moving inclined selenium belt 12 in order to provide development of the electrostatic image.

As the developing material is cascaded over the xerographic plate, toner particles in the development material are deposited on the belt surface to form powder images. As toner powder images are formed, additional toner particles are supplied to the developing material in proportion to the amount of toner deposited on the belt during xerographic processing. For this purpose, a toner dispenser generally indicated by reference numeral 15 is used to accurately meter toner to the developer material in the developer assembly 14.

The developed electrostatic image is transported by the belt to a transfer station C whereat a sheet of copy paper is moved at a speed approximately in synchronism with the moving belt in order to accomplish transfer of the developed image. There is provided at this station a sheet transport mechanism generally indicated at 16 adapted to transport sheets of paper from a paper handling mechanism generally indicated by the reference numeral 18 to the developed image on the belt at the station C.

After the sheet is stripped from the belt 12, it is conveyed into a fuser assembly generally indicated by the reference numeral 12 wherein the developed and transferred xerographic powder image on the sheet material is permanently affixed thereto. After fusing, the finished copy is discharged from the apparatus at a suitable point for collection externally of the apparatus.

Suitable drive means maybe arranged to drive the selenium belt 12 in conjunction with timed flash exposure of an original to be copied, to effect conveying and cascade of toner material, to separate, and feed sheets of paper and to transport the same across the transfer station C and to convey the sheet of paper through the fuser assembly in timed sequence to produce copies of the original.

It is believed that the foregoing description is sufficient for the purposes of this application to show the general operation of an electrostatic copier using an illumination system constructed in accordance with the invention. For further details concerning the specific construction of the electrostatic copier, reference is made to copending application Ser. No. 731,934 filed concurrently herewith in the name of Hewes et al.

Figure 2:
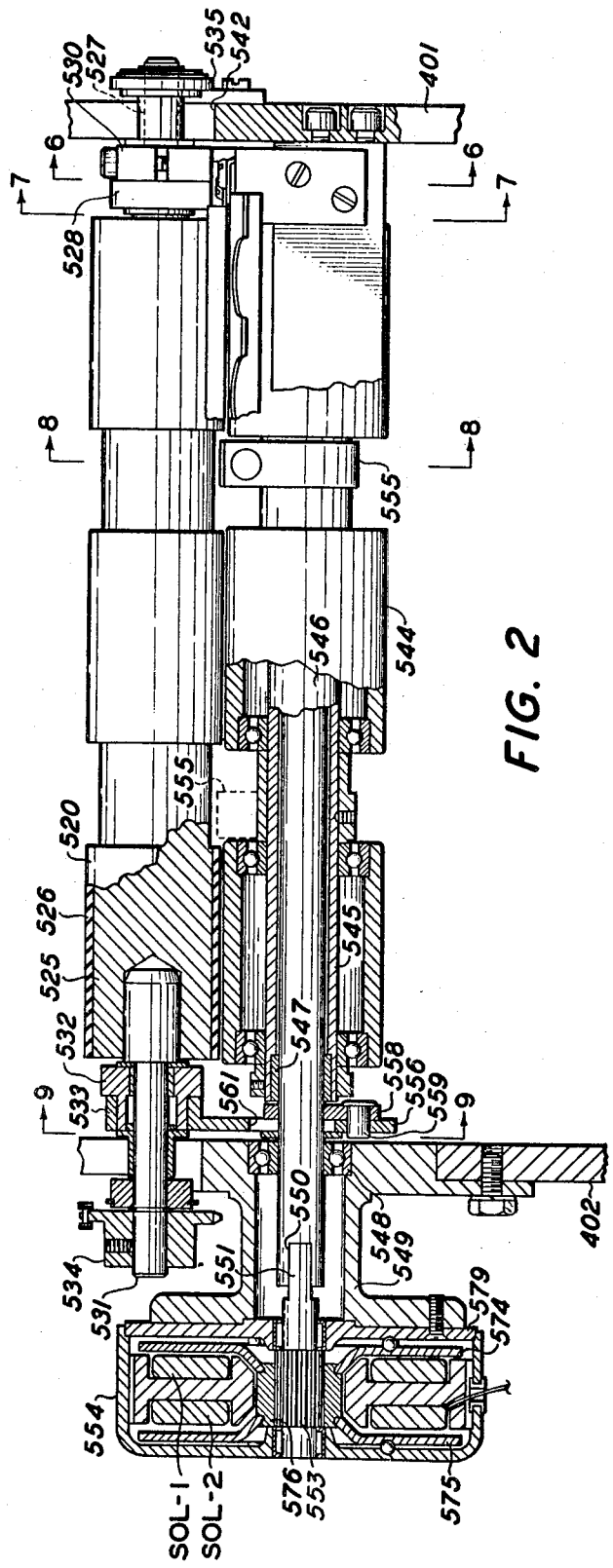
FIG. 2 is a sectional view with parts broken away of paper registration rollers utilized with a paper feeding mechanism for the reproduction machine.

In the sheet registration mechanism illustrated in FIGS. 2 and 6–9 the registeration rollers 520, 521 are adapted to cooperate with a pair of registering fingers interposed in the path of movement of a sheet being fed by the separator rollers in the paper handling mechanism 18 in order to align the leading edge of each sheet to a precise position before the sheet is permitted to continue on to the paper transport mechanism 16 whereat the developed electrostatic image on the belt 12 will be transferred. As shown in FIG. 2, the top registration roll 520 comprises a central metallic core 525 having a plurality of soft rubber layers 526 therearound adapted to engage frictionally a sheet of paper. The roller 520 is mounted at one end on a stub shaft 527 (see FIG. 7) supported in a bearing housing 528 held by a clamp 530 to the shaft and, at is other end on a stub shaft 531 supported in a bearing housing 532 held thereto by a clamp 533.

At the left end of the registration roller 520 as viewed in FIG. 2, a sprocket 534 is secured to the stub shaft 531. The bearing housings 528 and 532 are eccentric in nature so as to provide adjustment to the pinch between the upper register roller 520 and the lower roller 521. The end of the registration roller 520 is also supported by levers 535, 536 pivotally mounted at their ends by fixed stub shafts 537 secured on a frame comprising platen 401, 402 respectively, in axial alignment. For further details concerning the specific construction of the paper handling mechanism 18 and its cooperative relationship relative to the sheet registration mechanism, reference is made to copending application Ser. No. 740,406, filed concurrently herewith in the name of Hoffman et al.

Located immediately below the top registration roller 520 and parallel therewith, the lower roller 521 comprises a plurality of free wheeling, short roller 544 all of which are rotatably mounted with ball bearings upon a common sleeve 545 which is rotatably mounted on a drive shaft 546 by means of roller bearing 547 provided at each end thereof. The shaft 546 is mounted at one end to the frame plate 401 by suitable bearings and at the other end by a bearing 548 secured in the solenoid mount 549. At this end, the shaft 546 terminates in a straight slot 550 into which projects a tongue 551 formed on the end of a movable actuator 553 for double-acting rotary solenoid 554. The solenoid 554 comprises an "up" solenoid SOL–1 and a "down" solenoid SOL–2 and is adapted to impart non-axial rotary motion to the drive shaft 546 in either direction for approximately 45° upon energization of each of the solenoid coils associated with the solenoids SOL–1 and SOL–2.

Mounted upon the sleeve 545 between any two of the free wheeling rollers 544 are registration fingers 555 which are secured by suitable set screws upon the sleeve 545 to be moved therewith or held stationary when the sleeve is held against rotation.

Figure 8:
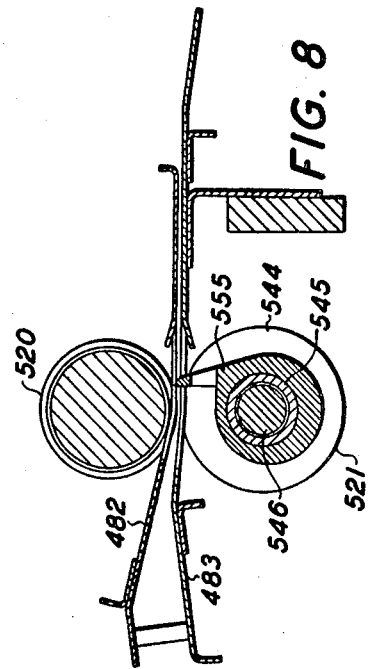
FIG. 8 is a sectional view showing the registration fingers and taken along line 8—8 in FIG. 2.

As shown in FIG. 8, the periphery of the roller 520 is slightly spaced from the periphery of the rollers 544. This spacing is greater than the thickness of a sheet of paper and permits the sheet to enter within the nip between the rollers and, against the fingers 555 and to maintain this position until a feed cycle is activated. At this time in the cycle, paper is still being driven by the feed rollers 485, 486. This action is opposed by the fingers 555 in the paper path causing the paper to buckle momentarily, squaring the front edge. With the forward edge of a sheet of paper against the fingers 555, the upper roller 520 is continuously driven but being spaced slightly from the top surface of the sheet of paper it is incapable of driving the sheet beyond the fingers. In order to permit the proper alignment of the forward edge of the sheet of paper against the registration fingers 555 and then to accomplish forward feeding movement to the sheet by means of the rollers 521, 520 the registration system is provided with a control mechanism which controls the movement of the upper roller 520 downwardly into engagement with the sheet of paper located therebelow in order to drive the same at the same time as the retracting movement of the fingers 555 in order to eliminate the impeding action by these fingers against the forward edge of the sheet.

Figure 9:
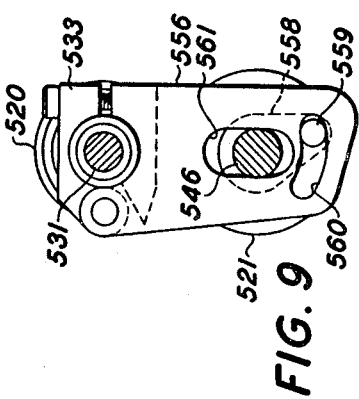
FIG. 9 is a sectional view of the roller bearing support taken along line 9—9 in FIG. 2.

This control mechanism includes a first link member 556 arranged to encircle both shafts 531, 546 for the rollers 520, 521 respectively adjacent the frame plate 402 and, a second link member 557 arranged to encircle both shafts for the upper and lower registration rollers adjacent the frame plate 401. These link members more or less hold the two rollers in super-imposed close relationship. Movement of the upper registration roller 520 toward the lower roller a slight increment is accomplished during energization of the solenoid SOL–2. Upon this energization, the actuator 553 is rotated an angular distance of 45° which action imparts similar rotation to the drive shaft 546. As shown in FIG. 9, a crank 558 secured to the shaft 546 of the lower roller 521 and having a cam pin 559 arranged for movement in a cooperating arcuate internal cam 560 formed in the lower end of the link 556 is adapted to force the shaft 531 toward the shaft 546. As previously stated, the levers 535 and 536 permit limited movement of the upper roller 520 toward and away from the lower roller 521. As the crank 558 is rotated clockwise as viewed in FIG. 9, the cam pin 559, as it moves from the right hand end of the cam 560 to approximately the center point thereof, will drive the link member 556 slightly downwardly carrying therewith the roller 520 toward the roller 521.

In order to maintain the fixed position of the shaft 546 for the lower roller, the link 556 is formed with a vertical extending slot 561 through which the shaft 546 extends.

This provides a lost motion connection between the link 556 and the shaft 546 during the slight upper and lower movement of this link. Continuing movement of the cam pin 559 from the approximate center point of the cam 560 to the left hand end of the slot, a total angular distance equal to 45° produced by the continued rotation of the solenoid SOL-2 armature 553, the distance between the axes of the shafts 531 and 546 remains the same. This movement of the cam pin 559 can be considered dwell time for the operation of the motion producing mechanism to effect engagement of the roller 520, 521 in order to permit the remaining rotation of the shaft 546 to perform another function, that of rotating the registration fingers 555 out of engagement with the leading edge of a sheet of paper.

The mechanism to control movement of the fingers 555 is illustrated in two sequences of operation in FIGS. 6 and 7 and is effected by actuation of the link member 557. The link member 557 is identical with the link member 556 and is formed with a vertical straight slot 562 through which the shaft 546 extends for lost motion when the link member 557 is moved and, an internal cam 563 through which a control cam pin 564 projects. The curvature and angular relationship and distance of the cam 563 relative to the axis of the shaft 546 is the same as the cam 560. Consequently during rotation of the shaft 546 in a clockwise direction, as viewed in FIG. 9 the positioning and movement of the pin 564 is the same as the pin 559.

Secured to the shaft 546 adjacent the link member 557 is a sector gear 565 to which the cam pin 564 is attached. Meshing with the gear 565 is a second sector gear 566 mounted for rotation on a pivot pin 567 secured to the frame plate 401. The pivot pin 567 also supports for rotation thereon a cam member 568 secured to the sector gear 566 and made adjustable therewith by means of a set screw 569 threadedably received in the member 568 and engageable with the sector 566 to permit angular adjustment of one with the other. It will be apparent upon rotation of the shaft 546, the sector 565 will be rotated and the cam pin 564 will be moved in the cam 563 thereby driving the link member 557 downwardly. This motion of the link member 557 is simultaneous and equal to the motion of the downward link 556 in order to impart the smooth uniform motion of the roller 520 downwardly.

As shown in FIG. 7, the cam member 568 is formed with an angled internal cam which is formed so as to have a first cam portion 570 with a center of curvature approximately coincident with the axis of the pivot pin 567 and a second cam portion 571 which merges with one end of the angled cams but extends radially toward the pivot pin axis. The angled cam is adapted to control movement of a rotatable actuating element 572 rotatably mounted on the shaft 546 adjacent the sector gear 565 and secured to one end of the sleeve 545. This is accomplished by means of a control pin 573 secured to one end of the actuating element 572 and retained within the cam portion 570, 571 to be movable therein. Upon rotation of the link 568 from the position shown in FIG. 8, wherein the pin 573 is in the arcuate cam portion 570 of the angled cam, no rotation is imparted to the actuating member 572, that is, the register fingers 555 will not be rotated. This result occurs because the control pin 573 merely slides in an arcuate cam as the cam member 568 pivots about its axis. This initial rotation of the member 568 is produced by the initial energization of the solenoid armature SOL-2 which action also produces the short movement of the control pin 559 for the first portion of its movement in the cam 560 as previously described. The resultant action merely keeps the upper roller 520 against the lower roller 521 and the register fingers in dwell.

When the pin 573 reaches the end of the cam 570 at the apex of the cam angle, continued rotation of the link member will actuate the pin 573 in the same direction therewith to produce clockwise rotation of the actuating element 572 as viewed in FIG. 7 in order to produce slight rotation of the sleeve 545 along its axis. Since the fingers 555 are secured to the sleeve 545 this last motion of the rotation of the link members 557 causes movement of the fingers away from the leading edge of the sheet of paper between the rollers 520, 521. The rotation of the fingers will be clockwise as viewed in FIG. 8. The set screw 569 is utilized to orientate the member 568 relative to the sector gear 566 in order to insure proper rotation of the actuating member 572 at a time when the rollers 520, 521 are in engagement. When this occurs the upper roller 520 engages the short rollers 544 of the lower roller to impart rotation thereto for driving this sheet therebetween at the same time that the fingers 555 are moving in the same direction as the leading edge of the sheet but in addition downwardly in order to become clear of this edge.

From the foregoing the paper sheet feeding mechanism 18 is adapted to feed continuously individual sheets of paper to the sheet registration device in the form of the rollers 520, 521 and the fingers 555 located in the path of movement of the paper. The sheet registration device arrests and aligns each individual sheet of material and then in timed relation to the movement of the xerographic belt 12 advances the sheet material into contact with the belt in registration with a previously formed xerographic powder image on the belt.

As previously stated the double-acting rotary solenoid 554 comprises a pair of pancake solenoids SOL-1 and SOL-2 and, is arranged to produce rotation of the shaft 546 in either direction without the usual incidental movement in the axial direction. In accomplishing this function, the "up" solenoid SOL-1 has its armature 574 in the form of a flat disc and arranged to be rotated in one direction when the solenoid is energized and, the "down" solenoid SOL-2 has its armature 575 also in the form of a flat disc arranged to be rotated in the opposite direction when this solenoid is energized.

The disc armatures are arranged in parallel planes and have their axes in alignment. Each is formed with an axial opening through which a rotary element 576 extends and is secured to the armatures to be movable therewith as a unit. The element 576 slidably receives the actuator 553 and is provided with internal teeth that mesh with the splined exterior surface of the actuator to which is connected the tongue 551 and groove 550 as a driving connection to the shaft 546 for the lower registration roller 521. As each of the armatures 574 and 575 is moved by its respective energized solenoid coil, it moves the element axially along the actuator and moves the other armature away therewith.

Upon energization of either of the coils for the solenoids, the respective armature will be driven in rotational movement. This rotary motion is produced by the cooperative action of a plurality of balls 577 rotatably held within a pair of coacting inclined depressions 578 formed one on the outer surfaces of each armature and the other in cover plates 579 which may surround the solenoids as a casing therefor. The depressions 578 are disposed so that their longitudinal axes and therefore, the inclined surfaces are circular having a radius of curvature on the axes for the armatures. Each of the cover plates 579 and armature associated therewith are held one parallel to the other and close enough so that the balls are retained with the inclined depressions in the armatures and their coacting inclined depression 578 in the cover plates.

In operation, when the solenoid SOL-2 is energized and the other SOL-1 deenergized, the armature 575 is attracted to the coil for SOL-2. This causes the element 576 to slide to the right, as viewed in FIG. 2 without producing axial movement of the actuator 553. Movement of the element 576 causes the other armature 574 to be driven toward the adjacent cover plate 579, that is, from the position shown in FIG. 4 to that shown in FIG. 5. This action forces the balls 577 to roll along the inclined surfaces of the depressions 578 and, since the cover plate is held rigid, the armature 574 will rotate and in an amount determined by the length of the depressions 578 and the distance the armature is allowed to move axially. For purposes of actuating the upper registration roller 520 into a paper feeding position and to reposition the fingers 555, the amount of angular rotation desirable is approximately 45°.

In the event the "up" solenoid SOL-1 is energized, the armature 575 will be rotated in the same manner, but in the opposite direction as the armature 574. Regardless of which of the solenoids are energized, both armatures with the element 476, secured therebetween will move as a unit and will slide relative to the actuator 553. However, the actuator will be rotated, the direction being determined by which of the solenoids being energized. With the "up" solenoid SOL-1 energized, the roller 520 will be held in its upper most position and the fingers 555 in a sheet engaging condition.

While there is in this application specifically described one form which the invention may assume in practice, it will be understood that this form of the same is shown for purposes of illustration, and that the invention may be modified and embodied in various other forms without departing from the scope of the appended claims.

I claim:

1. A drive mechanism for producing rotation of a shaft in two directions without imparting axial movement thereof including:
    first and second solenoids having corresponding coils and armatures associated therewith, said first solenoid being adapted to move its armature in one direction upon energization of the coil therefor and said second solenoid being adapted to move its armature in another direction opposite to that of said first direction upon energization of its coil,
    an operable connection between the armature of each of said solenoids and the shaft, said connection allowing sliding movement of both armatures relative to the shaft when either armature is moved in said one or said other direction respectively, but will rotate the shaft when either of the armatures is rotated an in the same rotative direction thereof,
    a drive connection between the coil of each of said solenoids and the armature, associated with the other coil one drive connection being adapted to impart rotation in a first rotative direction to the armature of said first solenoid upon movement thereof in said one direction and, the other drive connection being adapted to impart rotation in a second rotative direction to the armature of said second solenoid upon movement thereof in said other direction,
    and control means for selectively energizing said coils and thetreby effect rotation of the shaft in either direction under control conditions.

2. The drive mechanism of claim 1 wherein each of said solenoid armatures is in the form of a disc and is formed with an opening through which the shaft projects.

3. The drive mechanism of claim 2 wherein each of the solenoid coils is annular in form and encircles the shaft.

4. A sheet registration mechanism having a pair of registration rollers with one of the rollers being rotatably mounted on a fixed shaft and the other on a movable shaft, a drive mechanism for producing rotation of the fixed shaft in two directions without imparting axial movement thereof including:
    first and second solenoids having corresponding coils and armatures associated therewith, said first solenoid being adapted to move its armature in one direction upon energization of the coil therefor and said second solenoid being adapted to move its armature in another direction opposite to that of said first direction upon energization of its coil,
    an operable connection between the armature of each of said solenoids and the shaft, said connection allowing sliding movement of both armatures relative to the shaft when either armature is moved in said one or said other direction respectively, but will rotate the shaft when either of the armatures is rotated and in the same rotative direction thereof,
    a drive connection between the coil of each of said solenoids and the armature, associated with the other coil one drive connection being adapted to impart rotation in a first rotative direction to the armature of said first solenoid upon movement thereof in said one direction and, the other drive connection being adapted to impart rotation in a second rotative direction to the armature of said second solenoid upon movement thereof in said other direction,
    and control means for selectively energizing said coils and thereby effect rotation of the fixed shaft in either direction under control conditions.

References Cited

UNITED STATES PATENTS

| | | | |
|---|---|---|---|
| 2,482,840 | 9/1949 | Collins et al. | 310—77 |
| 2,972,467 | 2/1961 | Gilman | 74—107 |
| 3,308,410 | 3/1967 | Biser | 74—126 |

MARK M. NEWMAN, Primary Examiner

W. S. RATLIFF, JR., Assistant Examiner

U.S. Cl. X.R.

310—76; 335—228